(12) United States Patent
Keränen et al.

(10) Patent No.: US 10,091,637 B2
(45) Date of Patent: Oct. 2, 2018

(54) PROVIDING INFORMATION TO A SERVICE IN A COMMUNICATION NETWORK

(71) Applicant: Telefonaktiebolaget LM Ericsson (publ), Stockholm (SE)

(72) Inventors: Ari Keränen, Helsinki (FI); Tero Kauppinen, Espoo (FI); Jan Melén, Espoo (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/110,914

(22) PCT Filed: Jan. 28, 2014

(86) PCT No.: PCT/SE2014/050110
§ 371 (c)(1),
(2) Date: Jul. 11, 2016

(87) PCT Pub. No.: WO2015/115944
PCT Pub. Date: Aug. 6, 2015

(65) Prior Publication Data
US 2016/0337837 A1    Nov. 17, 2016

(51) Int. Cl.
*H04W 8/00*   (2009.01)
*H04W 4/70*   (2018.01)
(Continued)

(52) U.S. Cl.
CPC ............. *H04W 8/005* (2013.01); *H04L 67/04* (2013.01); *H04L 67/12* (2013.01); *H04L 67/16* (2013.01);
(Continued)

(58) Field of Classification Search
CPC ..... H04W 4/005; H04W 4/006; H04W 4/008; H04W 4/02; H04W 4/12; H04W 8/005; H04W 8/02
(Continued)

(56) References Cited

U.S. PATENT DOCUMENTS

| | | | |
|---|---|---|---|
| 8,769,290 B1* | 7/2014 | Jacobs | H04L 12/417 713/150 |
| 2005/0033852 A1* | 2/2005 | Tenhunen | G06Q 10/107 709/229 |

(Continued)

FOREIGN PATENT DOCUMENTS

| | | |
|---|---|---|
| WO | 2011112683 A1 | 9/2011 |
| WO | 2013071949 A1 | 5/2013 |

(Continued)

OTHER PUBLICATIONS

Colitti, Walter, et al., "Integrating Wireless Sensor Networks with the Web," Workshop on Extending the Internet to Low power and Lossy Networks (IP+SN 2011), Apr. 2011, 5 pages.
(Continued)

*Primary Examiner* — Jean Gelin
(74) *Attorney, Agent, or Firm* — Withrow & Terranova, PLLC

(57) ABSTRACT

The present disclosure relates to a method performed by a network element 2 in a communication network 1. The method comprises detecting a machine device (MD) 4 able to provide a first type of information to the network. The method also comprises receiving an information message comprising a token of a service 3 which is interested in receiving the first type of information. The method also comprises sending a request message to the MD comprising the token and a request for the MD to send the first type of information together with the token. The present disclosure also relates to a machine device as well as to the network
(Continued)

element and a rendezvous point, and methods thereof, in the network.

16 Claims, 3 Drawing Sheets

(51) Int. Cl.
*H04L 29/08* (2006.01)
*H04W 4/00* (2018.01)

(52) U.S. Cl.
CPC ............ *H04W 4/005* (2013.01); *H04W 4/70* (2018.02); *H04L 67/2861* (2013.01)

(58) Field of Classification Search
USPC ... 455/412.1, 412.2, 414.1, 414.2, 418, 419, 455/420, 41.1, 41.2, 411, 410, 432.3
See application file for complete search history.

(56) References Cited

U.S. PATENT DOCUMENTS

| | | | | |
|---|---|---|---|---|
| 2010/0322213 | A1* | 12/2010 | Liu | H04L 67/16 370/338 |
| 2012/0182131 | A1* | 7/2012 | Shiotsu | G06K 7/0008 340/10.4 |
| 2013/0218816 | A1* | 8/2013 | Yu | G06N 99/005 706/12 |
| 2013/0290722 | A1* | 10/2013 | Kall | H04L 12/4633 713/171 |
| 2013/0311140 | A1* | 11/2013 | Schechter | H04L 67/34 702/188 |
| 2013/0325887 | A1* | 12/2013 | Takaoka | G06F 17/30283 707/758 |
| 2014/0138432 | A1* | 5/2014 | Park | A61B 5/002 235/375 |
| 2014/0140254 | A1* | 5/2014 | Nieminen | H04W 4/70 370/311 |
| 2014/0315494 | A1* | 10/2014 | Son | A61B 5/0002 455/41.2 |
| 2015/0067176 | A1* | 3/2015 | Dubois | H04L 69/08 709/227 |
| 2016/0048712 | A1* | 2/2016 | Butler | H04L 67/1097 340/10.51 |
| 2016/0171479 | A1* | 6/2016 | Prakash | G06Q 20/3226 705/44 |
| 2016/0337314 | A1* | 11/2016 | Yu | H04L 63/0227 |
| 2016/0381543 | A1* | 12/2016 | Zhang | H04W 4/008 455/411 |

FOREIGN PATENT DOCUMENTS

| | | |
|---|---|---|
| WO | 2013088323 A2 | 6/2013 |
| WO | 2013121076 A1 | 8/2013 |

OTHER PUBLICATIONS

Hartke, Klaus, "Observing Resources in CoAP," CoRE Working Group, Internet-Draft, draft-ietf-core-observe-09, Intended status: Standards Track, Jul. 15, 2013, IETF Trust, pp. 1-29.

Shelby, Zach, et al., "Constrained Application Protocol (CoAP)," CoRE Working Group, Internet-Draft, draft-ietf-core-coap-12, Intended status: Standards Track, Oct. 1, 2012, IETF Trust, pp. 1-108.

Shelby, Zach, et al., "Constrained Application Protocol (CoAP)," CoRE Working Group, Internet-Draft, draft-ietf-core-coap-18, Intended status: Standards Track, Jun. 28, 2013, IETF Trust, pp. 1-118.

Shelby, Zach, et al., "CoRE Resource Directory," CoRE, Internet-Draft, draft-ietf-core-resource-directory-00, Intended status: Standards Track, Jun. 3, 2013, IETF Trust, pp. 1-27.

International Search Report and Written Opinion for International Patent Application No. PCT/SE2014/050110, dated Sep. 25, 2014, 12 pages.

* cited by examiner

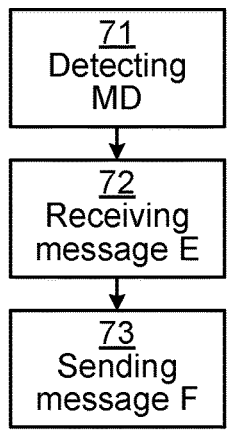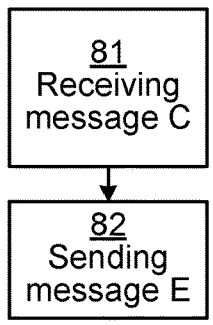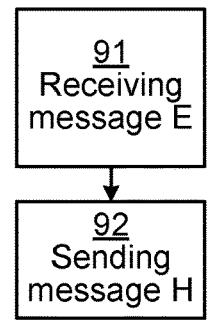
Fig. 7a    Fig. 8a    Fig. 9a
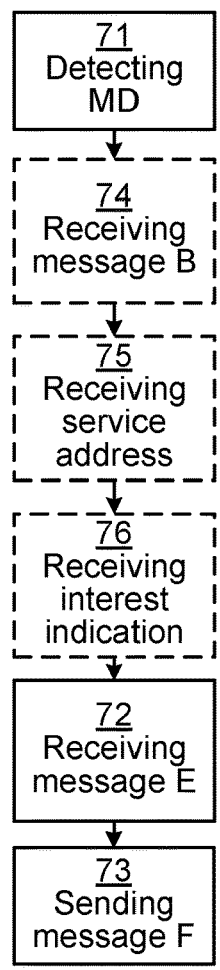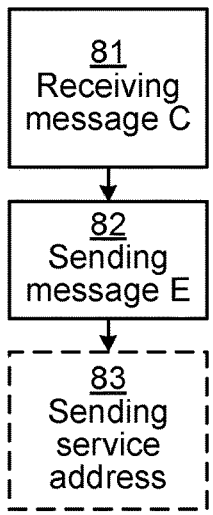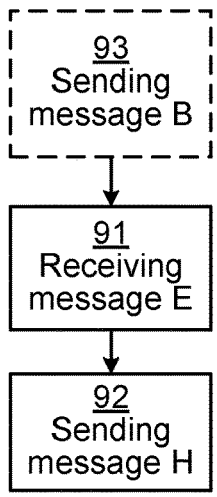
Fig. 7b    Fig. 8b    Fig. 9b

PROVIDING INFORMATION TO A SERVICE IN A COMMUNICATION NETWORK

This application is a 35 U.S.C. § 371 national phase filing of International Application No. PCT/SE2014/050110, filed Jan. 28, 2014, the disclosure of which is incorporated herein by reference in its entirety.

TECHNICAL FIELD

The present disclosure relates to methods and devices for providing a service with information from a machine device (MD), in a communication network (NW).

BACKGROUND

In many Internet of Things (IoT) scenarios, certain machine devices (MDs), such as temperature sensors or accelerometers, should be providing data to various endpoints that store and/or use the data to provide services based on them. Services could e.g. include activating an actuator based on a reading from a sensor or set of sensors, such as changing a temperature of a heater based on the measurements from temperature sensors or adjusting an industrial process based on sensor readings of the current state of the process. However, the endpoints that need the data may not be aware of the location, or even existence, of the MDs and hence have no means for requesting the data from them.

Existing solutions for discovering sensor devices and requesting data from them include Constrained Application Protocol (CoAP), CoAP Resource Directory (RD) and CoAP observe extension. The CoAP protocol allows efficient RESTful communication (i.e. communication conforming to representational state transfer (REST)) in constrained environments between the MDs and services. The RD extension enables the MDs to register their location to a centralized entity and the observe extension allows services to register their interest to certain resource (e.g., temperature value) provided by the MD and get notifications when the resource has changed.

To be able to use an RD, the MD needs to register to the RD and the endpoint (i.e. service) interested in the data of the MD needs to query the same RD for the device location before it can query for the data or establish an observation relationship with the MD. Both the MD and the service need to know the location (IP address) of the RD. While mechanisms for discovering RD location exist (e.g., multicast discovery of RD for MDs, domain name system (DNS) queries by services, etc.), the location information may not be available for these discovery mechanisms (e.g., if the IP address is not in DNS) or the discovery mechanisms may not be supported by the constrained MDs.

SUMMARY

It is an objective of the present disclosure to provide solutions to problems where the location of the MDs and the services (could also be called service provider) is not known by either one of the endpoints (service and MD), but only by a third party (herein called a network element or NW element), and also cases where traditional discovery mechanisms, such as RD, are not available. In accordance with the present disclosure, the NW element establishes an observe relationship with the MD on behalf of the service requesting information of a type provided by the MD. The MD can then send requested information directly to the service.

According to an aspect of the present disclosure, there is provided a method performed by a network element (NW element) in a communication network. The method comprises detecting a machine device (MD) able to provide a first type of information to the network. The method also comprises receiving a request message comprising a token of a service which is interested in receiving the first type of information. The method also comprises sending a request message to the MD comprising the token and a request for the MD to send the first type of information together with the token.

According to another aspect of the present disclosure, there is provided a computer program product comprising computer-executable components for causing a network element in a communication network to perform an embodiment of a method of the present disclosure when the computer-executable components are run on processor circuitry comprised in the network element.

According to another aspect of the present disclosure, there is provided a network element for a communication network. The network element comprises processor circuitry, and a storage unit storing instructions that, when executed by the processor circuitry, cause the network element to detect an MD able to provide a first type of information to the network. The instructions also cause the network element to receive a request message comprising a token of a service which is interested in receiving the first type of information. The instructions also cause the network element to send a request message to the MD, comprising the token and a request for the MD to send the first type of information together with the token.

According to another aspect of the present disclosure, there is provided a network gateway having an embodiment of the network element of the present disclosure integrated therein.

According to another aspect of the present disclosure, there is provided a computer program comprising computer program code which is able to, when run on processor circuitry of a network element in a communication network, cause the network element to detect an MD able to provide a first type of information to the network. The code is also able to cause the network element to receive a request message comprising a token of a service which is interested in receiving the first type of information. The code is also able to cause the network element to send a request message to the MD comprising the token and a request for the MD to send the first type of information together with the token.

According to another aspect of the present disclosure, there is provided a method performed by a rendezvous point (RP) in a communication network. The method comprises receiving a service message from a service comprising an indication that the service is interested in receiving a first type of information, and comprising a token of the service for the first type of information. The method also comprises sending a request message comprising the token to at least one network element in the communication network, indicating to the network element to request the first type of information from an MD which is able to provide the first type of information to the service.

According to another aspect of the present disclosure, there is provided a computer program product comprising computer-executable components for causing an RP in a communication network to perform an embodiment of a method of the present disclosure when the computer-executable components are run on processor circuitry comprised in the RP.

According to another aspect of the present disclosure, there is provided an RP for a communication network. The RP comprises processor circuitry, and a storage unit storing instructions that, when executed by the processor circuitry, cause the RP to receive a service message from a service comprising an indication that the service is interested in receiving a first type of information, and comprising a token of the service (3) for the first type of information. The instructions also cause the RP to send a request message comprising the token to at least one network element in the communication network, indicating to the network element to request the first type of information from an MD which is able to provide the first type of information to the service.

According to another aspect of the present disclosure, there is provided a computer program comprising computer program code which is able to, when run on processor circuitry of an RP in a communication network, cause the RP to receive a service message from a service comprising an indication that the service is interested in receiving a first type of information, and comprising a token of the service (3) for the first type of information. The code is also able to cause the RP to send a request message comprising the token to at least one network element in the communication network, indicating to the network element to request the first type of information from an MD which is able to provide the first type of information to the service.

According to another aspect of the present disclosure, there is provided a method performed by a machine device (MD) able to provide a first type of information to a communication network. The method comprises receiving a request message from a network element in the communication network. The request message comprises a token of a service, an address to the service and a request for the MD to send the first type of information together with the token to the service. The method also comprises sending an information message comprising the first type of information and the token to the service by means of the received address to the service.

According to another aspect of the present disclosure, there is provided a computer program product comprising computer-executable components for causing an MD to perform an embodiment of a method of the present disclosure when the computer-executable components are run on processor circuitry comprised in the MD.

According to another aspect of the present disclosure, there is provided an MD configured to be able to provide a first type of information to a communication network. The MD comprises processor circuitry, and a storage unit storing instructions that, when executed by the processor circuitry, cause the MD to receive a request message from a network element in the communication network. The request message comprises a token of a service, an address to the service and a request for the MD to send the first type of information together with the token to the service. The instructions also cause the MD to send an information message comprising the first type of information and the token to the service by means of the received address to the service.

According to another aspect of the present disclosure, there is provided a computer program comprising computer program code which is able to, when run on processor circuitry of an MD able to provide a first type of information to a communication network, cause the MD to receive a request message from a network element in the communication network. The request message comprises a token of a service, an address to the service and a request for the MD to send the first type of information together with the token to the service. The code is also able to cause the MD to send an information message comprising the first type of information and the token to the service by means of the received address to the service.

By means of the NW element being provided with the token, the NW element can provide the token to the MD which has the information requested by the service. By the MD then including the token together with the requested information in a message to the service, the service can identify the received information even though the information is sent directly from the MD. Embodiments of the present disclosure allow services to obtain data from MDs without having to discover them or the MDs having to register themselves directly to a resource directory. Since the MD may not be required to perform a registration itself, the functionality of the MD can be kept simpler and signalling traffic over e.g. a radio link is reduced. In addition, since the NW element may aggregate one or more MDs, the NW element may reduce the amount of signalling by combining the information from several MDs into a single message.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 7a is a schematic flow chart of an embodiment of a method performed by a network element, of the present disclosure.

FIG. 7b is a schematic flow chart of another embodiment of a method performed by a network element, of the present disclosure.

FIG. 8a is a schematic flow chart of an embodiment of a method performed by a rendezvous point, of the present disclosure.

FIG. 8b is a schematic flow chart of another embodiment of a method performed by a rendezvous point, of the present disclosure.

FIG. 9a is a schematic flow chart of an embodiment of a method performed by a machine device, of the present disclosure.

FIG. 9b is a schematic flow chart of another embodiment of a method performed by a machine device, of the present disclosure.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
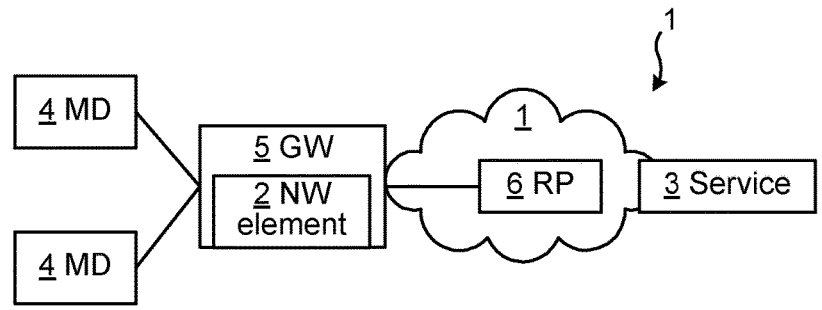
FIG. 1 is a schematic block diagram of an embodiment of a communication network in accordance with the present disclosure.

FIG. 1 is a schematic block diagram of an embodiment of a communication network (NW) 1 in accordance with the present disclosure. The NW 1 comprises a rendezvous point (RP) 6 configured to connect one or a plurality of service(s) 3 to other parts of the NW 1 and possibly beyond the NW 1. The service 3 (could also be called a service provider or such) may be configured for providing a service, within the NW 1 and/or beyond the NW 1, based on information obtained from one or a plurality of machine devices (MD) 4, e.g. sensors. In FIG. 1, the RP 6 is connected to a gateway (GW) 5, e.g. a capillary NW GW providing internet connectivity for a set of MDs that use short-range radio technologies such as Wi-Fi or Bluetooth. Since both the service (s) 3 and the GW 5 are aware of, and know the address/location of the RP 6, RP 6 provides a way for the GW 5 to discover or otherwise become aware of the service(s) 3, and similarly provides a way for the service(s) 3 to discover or otherwise become aware of the GW 5. By means of the RP 6, the service(s) 3 and the GW 5 may be enabled to communicate with each other by sending messages to each other over the NW 1. A plurality of MDs 4 are connected to the NW 1 via the GW 5. Each of the MDs 4 may be any type of device able to connect to the NW 1 via the GW 5, and is not limited to being a constrained device such as a sensor, although a sensor may be a typical MD 4 for which embodiments of the present disclosure may be beneficial and is used as an example herein. Any of the MD 4 may be a radio device, but it is also contemplated that an MD 4 configured for wired communication may be used in embodiments of the present disclosure. A radio device MD 4 may be any device or user equipment (UE), mobile or stationary, enabled to communicate over a radio cannel with the communications network 1 e.g. via the GW 5, for instance but not limited to e.g. sensors, meters, vehicles (e.g. car), household appliances, medical appliances, media players, cameras, or any type of consumer electronic, for instance but not limited to television, radio, lighting arrangements, tablet computer, laptop, or personal computer (PC). A network element 2 of the present disclosure is also comprised in the NW 1, possibly in or associated with the GW 5. The NW element 2 may function as an observer and a delegator, observing which MDs 4 are connecting to the GW 5, and delegating information, which a connected MD 4 is able to provide, to a service 3 which has requested the information, typically enabling the MD 4 to send the information directly to the service 3. The NW element 2, e.g. part of the GW 5 such as a capillary network gateway, may thus be aware of the MDs 4 that are attached to the network 1 via the GW 5, e.g. the MDs are attached to and in the same subnet as the GW whereby the NW element 2 may discover the MDs. The network element 2 might not be aware of the services 3 that are interested in the data (i.e. information) provided by the MDs 4. However, the RP 6 provides the network element 2 a way to discover services 3 that are interested in the MD information. The location of the RP 6 is known by both the network element 2 and services 3. In accordance with embodiments of the present disclosure, the service 3 may provide the NW element 2 with a token as a, e.g. secure, way for the service to identify the type of information it may then receive directly from the MD 4 since the information is sent together with the token. The token may be e.g. a random value or the service may encode some data to the token (e.g., to reduce the amount of state needed at the service). The service 3 can use the token to match incoming information data from an MD 4 to a certain type of information the service has requested or to a certain set of MDs 4.

Figure 2:
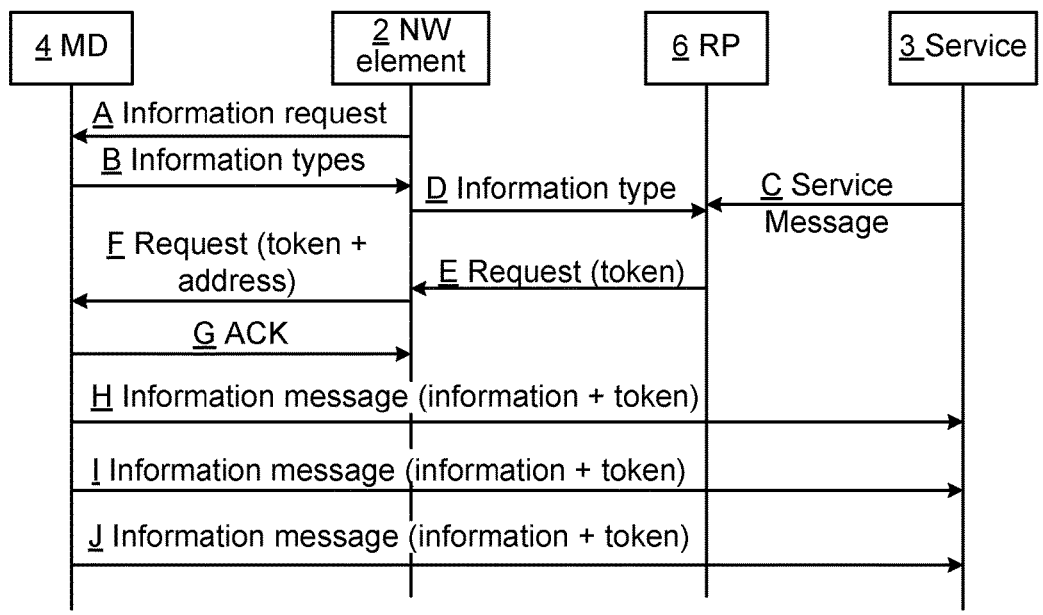
FIG. 2 is a schematic signalling diagram illustrating example embodiments of methods of the present disclosure.

FIG. 2 is a schematic signalling diagram illustrating example embodiments of the present disclosure. The signalling diagram displays signalling which may, as an example, occur between an MD 4, a NW element 2 (possibly comprised in or otherwise associated with a GW 5), an RP 6 and a service 3.

Not all messages may be needed for performing other embodiments of the present disclosure, and in some embodiments the order of the messages may be somewhat different from the example in FIG. 2. Also, other signalling may also occur before, after or concurrently with the signalling in the example of FIG. 2. It should be noted that the different messages discussed herein may be divided into a plurality of sub-messages such that all information which is herein stated to be comprised in any one message may not always be sent together but may be sent separately in different sub-messages.

The NW element 2 sends an information request A to the MD 4, requesting information about which types of information the MD can provide to the NW 1 and any services 3 requesting them. When a new MD 4 attaches to the network 1, served by the GW 5, the NW element can request (e.g., using CoAP resource discovery) information about the resources (e.g. types of information) provided by the MD by means of the information request A. If the MD 4 is already known by the GW/NW element (identified, e.g., using MAC address or security credentials used to attach to the network), the NW element may instead use cached (e.g. in its storage 32, FIG. 3) information about the information types provided by the MD and hence require less signalling especially in cases where the MD frequently attaches and detaches from the network.

In response to the information request A, the MD 4 sends an information type message B to the NW element 2, comprising the information about what types of information, e.g. sensor readings such as temperature and/or pressure etc., it can provide. Alternatively, the MD routinely sends the information type message B even if no information request A has first been received, in which case the information request A may not need to be sent by the NW element 2. Alternatively, the NW element 2 can passively observe the types of information sent by the MD and learn the information types available from MD.

Before, after or concurrently with the exchange of messages A and B, and typically independently thereof, the service 3 (which may be registered with or is otherwise associated with the RP) sends a service message C to the RP 6, comprising an indication of what type(s) of information the service 3 is interested in receiving from any MD 4 able to provide such type(s) of information. The service message C may also include additional constraints for the types of information, such as, the information should come from a certain type of MD (e.g., to guarantee certain kind of characteristics for the information source), the MDs providing the information should be from a certain geographical area, or only a certain amount of MDs should be used even if more are available. The service message C also includes a token (e.g. an opaque random value) for the requested type of information. The service 3 remembers with which type of information the specific token is associated. Different tokens may be included for different types of information requested by the service.

Before or after having received the service message C, the RP 6 receives an information type message D from the NW element 2 comprising information about what types of information the MD 4 it, and possibly other MDs connected to the NW element 2 (or with the GW 5 with which it is associated), can provide. The NW element may e.g. have been informed of the available information types by receiving one or a plurality of information type message(s) B, or by e.g. recognising the type of MD(s) it has detected.

After the RP 6 has received both messages C and D, it is aware of which types of information are requested by the service 3 as well as of which types of information can be provided by the MD 4. The RP 6 may then send a request message E to the NW element 2 comprising the token (for a type of information which it now knows that the MD 4 can provide) received from the service 3. The request message E also indicates to the network element 2 that it should request the type of information from MD 4. The request message E may also include an address to the service for sending the information requested by the service 3, if the address is not previously known by the NW element 2. The request message E may also comprise any constraint, as discussed in relation to the service message C, such as, that the information should come from a certain type of MD (e.g., to guarantee certain kind of characteristics for the information source), the MDs providing the information should be from a certain geographical area, or only a certain amount of MDs should be used even if more are available.

The NW element 2 may then send a request message F to the MD 4 able to provide the type of information requested by the service 3. The request message F may instruct the MD 4 to send the requested information data of the type of information to the NW element 2 for relaying to the service 3, but it may be more convenient, and reduce the signalling in the NW 1, if the request message E also comprises the address to the service, allowing the MD 4 to send the information data of the requested information type directly to the service 3. The request message F comprises the token which is associated with the information type. If the NW element is already aware of the request for an information type from the service 3, before it has detected an MD 4 able to provide the information type (e.g. if the information type message B has not yet been received), then the NW element 2 may wait until the MD 4 is detected (and possibly the information type message B is received) and then send the request message E. However, in some embodiments, the request from service 3 for a certain type of information may be associated with a restriction, e.g. a timer which allows the request for the information type to time out if no MD 4 able to provide it has been found before the timer expires. Such a restriction may also or alternatively be included with the request message E, informing the MD 4 that it can ignore the request if it cannot meet the restriction.

The MD 4 may send a response G to the NW element 2. If the NW element has instructed the MD to send the information data directly to the service 3, then the response G may only be an acknowledgement of having received the request message F.

In response to the request message F, the MD 4 may (if it has been provided with the address to the service 3) send an information message H, comprising its available information data of the requested information type as well as the token from the service, directly to the service 3. Since the service 3 has associated the token with the specific information type, it can identify the information data received from the MD 4 as being of the correct information type.

The MD may continue to report any new data obtained of the information type in further information messages I and J, all also including the token associated with the information type, until the MD is ordered to stop or e.g. a timer expires.

In accordance with the discussion relating to FIG. 2, some more specific embodiments of the present invention are mentioned below.

In some embodiments of the present disclosure, the request message E is received by the NW element 2 from an RP 6 in the network 1, which RP is aware of that the service 3 is interested in receiving the first type of information. However, in some embodiments of the present disclosure, no RP may be needed, especially if there are a limited number of NW element(s) 2 and/or GW(s) 5 in which case the service 3 may be able to communicate with the NW element(s) 2 and/or GW(s) 5 directly.

In some embodiments of the present disclosure, the network element 2 is comprised in, or otherwise associated with, a gateway 5 in the network 1, e.g. a capillary network gateway. At least a part of the NW element 2 may be or be part of the gateway 5, wherein the GW 5 may be arranged for connecting one or a plurality of MDs 4 to the NW 1.

In some embodiments of the present disclosure, the service message C comprises an indication of a timer period during which the service 3 is interested in receiving the first type of information. The service message C may also include additional constraints for the data, such as, the data should come from a certain type of MDs (e.g., to guarantee certain kind of characteristics for the data source), the MDs providing the data should be from a certain geographical area, or only certain amount of MDs should be used even if more are available.

Figure 3:
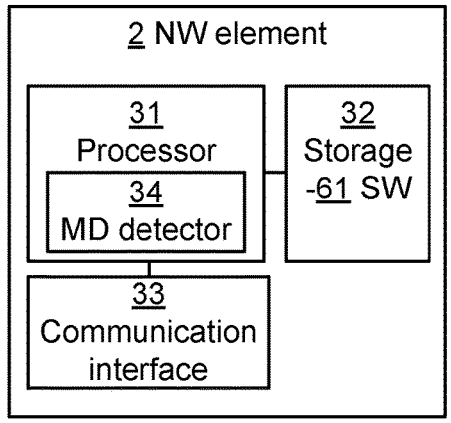
FIG. 3 is a schematic block diagram of an embodiment of a network element of the present disclosure.

FIG. 3 is a schematic block diagram of an embodiment of a network element 2 of the present disclosure. The network element 2 comprises processor circuitry 31 e.g. a central processing unit (CPU). The processor circuitry 31 may comprise one or a plurality of processing units in the form of microprocessor(s). However, other suitable devices with computing capabilities could be comprised in the processor circuitry 31, e.g. an application specific integrated circuit (ASIC), a field programmable gate array (FPGA) or a complex programmable logic device (CPLD). The processor circuitry 31 is configured to run one or several computer program(s) or software (SW) 61 (see also FIG. 6) stored in a storage 32 of one or several storage unit(s) e.g. a memory. The processor circuitry 31 comprises an MD detector module 34 as a result of running SW 61, for detecting an MD 4 connecting to the NW 1. The storage unit 32 is regarded as a computer readable means 62 (see FIG. 6) as discussed herein and may e.g. be in the form of a Random Access Memory (RAM), a Flash memory or other solid state memory, or a hard disk, or be a combination thereof. The processor circuitry 31 is also configured to store data in the storage 32, as needed. The network element 2 also comprises a communication interface 33 for communication with e.g.

the RP 6 and the MDs 4, typically comprising a transmitter and a receiver, which may be combined to form a transceiver or be present as distinct units within the network element 2. The communication interface 33 is configured to cooperate with the processor circuitry 31 to transform data bits to be transmitted to a suitable signal. Similarly, the communication interface 33 is configured to cooperate with the processor circuitry 31 to transform a received signal to data bits.

Figure 4:
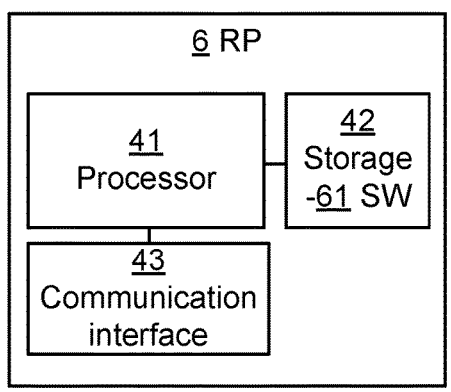
FIG. 4 is a schematic block diagram of an embodiment of a rendezvous point of the present disclosure.

FIG. 4 is a schematic block diagram of an embodiment of an RP 6 of the present disclosure. The RP 6 comprises processor circuitry 41 e.g. a central processing unit (CPU). The processor circuitry 41 may comprise one or a plurality of processing units in the form of microprocessor(s). However, other suitable devices with computing capabilities could be comprised in the processor circuitry 41, e.g. an application specific integrated circuit (ASIC), a field programmable gate array (FPGA) or a complex programmable logic device (CPLD). The processor circuitry 41 is configured to run one or several computer program(s) or software (SW) 61 (see also FIG. 6) stored in a storage 42 of one or several storage unit(s) e.g. a memory. The storage unit 42 is regarded as a computer readable means 62 (see FIG. 6) as discussed herein and may e.g. be in the form of a Random Access Memory (RAM), a Flash memory or other solid state memory, or a hard disk, or be a combination thereof. The processor circuitry 41 is also configured to store data in the storage 42, as needed. The RP 6 also comprises a communication interface 43 for communication with e.g. the network element 2 and the services(s) 3, typically comprising a transmitter and a receiver, which may be combined to form a transceiver or be present as distinct units within the RP 6. The communication interface 43 is configured to cooperate with the processor circuitry 41 to transform data bits to be transmitted to a suitable signal. Similarly, the communication interface 43 is configured to cooperate with the processor circuitry 41 to transform a received signal to data bits.

Figure 5:
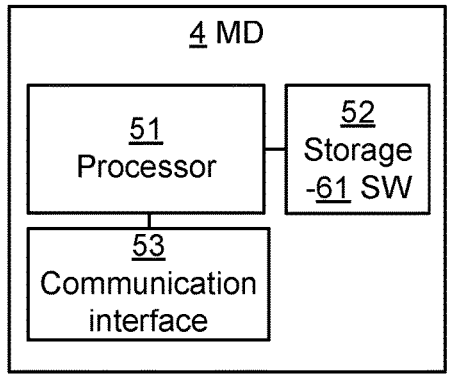
FIG. 5 is a schematic block diagram of an embodiment of a machine device of the present disclosure.

FIG. 5 is a schematic block diagram of an embodiment of an MD 4 of the present disclosure. The MD 4 comprises processor circuitry 51 e.g. a central processing unit (CPU). The processor circuitry 51 may comprise one or a plurality of processing units in the form of microprocessor(s). However, other suitable devices with computing capabilities could be comprised in the processor circuitry 51, e.g. an application specific integrated circuit (ASIC), a field programmable gate array (FPGA) or a complex programmable logic device (CPLD). The processor circuitry 51 is configured to run one or several computer program(s) or software (SW) 61 (see also FIG. 6) stored in a storage 52 of one or several storage unit(s) e.g. a memory. The storage unit 52 is regarded as a computer readable means 62 (see FIG. 6) as discussed herein and may e.g. be in the form of a Random Access Memory (RAM), a Flash memory or other solid state memory, or a hard disk, or be a combination thereof. The processor circuitry 51 is also configured to store data in the storage 52, as needed. The MD 4 also comprises a communication interface 53, e.g. a radio interface, for communication with e.g. the network element 2, typically comprising a transmitter and a receiver, which may be combined to form a transceiver or be present as distinct units within the MD 4. The communication interface 53 is configured to cooperate with the processor circuitry 51 to transform data bits to be transmitted to a suitable signal. Similarly, the communication interface 53 is configured to cooperate with the processor circuitry 51 to transform a received signal to data bits.

Figure 6:
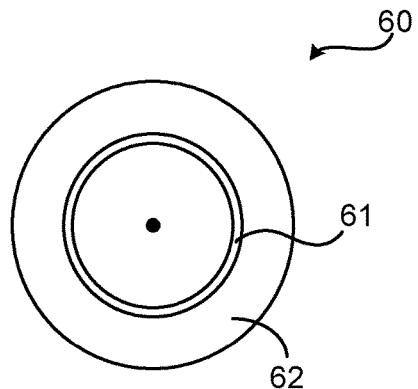
FIG. 6 is a schematic illustration of an embodiment of a computer program product of the present disclosure.

FIG. 6 illustrates a computer program product 60. The computer program product 60 comprises a computer readable medium 62 comprising a computer program 61 in the form of computer-executable components 61. The computer program/computer-executable components 61 may be configured to cause a device, e.g. a NW element 2, an RP 6 or an MD 4 as discussed herein, to perform an embodiment of a method of the present disclosure. The computer program/computer-executable components may be run on the processor circuitry 31/41/51 of the device for causing the device to perform the method. The computer program product 60 may e.g. be comprised in a storage unit or memory 32/42/52 comprised in the device and associated with the processor circuitry 31/41/51. Alternatively, the computer program product 60 may be, or be part of, a separate, e.g. mobile, storage means, such as a computer readable disc, e.g. CD or DVD or hard disc/drive, or a solid state storage medium, e.g. a RAM or Flash memory.

FIG. 7a is a schematic flow chart of an embodiment of a method performed by a network element 2 in a communication NW 1, of the present disclosure. An MD 4 able to provide a first type of information to the network 1 is detected 71, e.g. by means of a detection module 34 of the NW element 2. Before or after the MD 4 has been detected, a request message E is received 72, comprising a token of a service 3 which is interested in receiving the first type of information, as well as a request for information of said first type. The request message E may also comprise the address of the service 3 which can be used for sending the requested information to the service. The request message E may be received from the service 3, or from elsewhere within or outside of the NW 1. After which a request message F is sent 73 to the MD 4 comprising the token and a request for the MD to send the first type of information together with the token.

FIG. 7b is a schematic flow chart of another embodiment of a method performed by a network element 2 in a communication NW 1, of the present disclosure. The steps of detecting 71 an MD 4, receiving 72 a request message E and sending 73 a request message F are as discussed in respect of FIG. 7a. In addition, optional steps 74, 75 and/or 76 (illustrated with dashed boxes in the figure) may be performed. Thus, an information type message B may be received 74 from the MD 4, comprising an indication that the MD is able to provide the first type of information, before sending 73 the request message F. In some embodiments, an address to the service 3 is received 75, wherein the request message F comprises the received 74 address to the service 3 and an indication for the MD 4 to send the first type of information to the service 3 by means of the address. Thus the MD 4 can send the information data directly to the service, i.e. not back to the NW element 2 which sent the request message. The address may be received 75 as part of the request message E, or otherwise e.g. as part of another message. In some embodiments, an indication that the service 3 is interested in receiving the first type of information is received 76, before sending 73 the request message F to the MD 4. The indication may be received 76 as part of the request message E, or otherwise e.g. as part of another message.

FIG. 8a is a schematic flow chart of an embodiment of a method performed by an RP 6, of the present disclosure. A service message C is received 81 from a service 3, comprising an indication that the service 3 is interested in receiving a first type of information as well as a token of the service for this type of information. Then, a request message E comprising a token of the service 3 is sent 82 to a network element 2 in the communication network 1, indicating to the network element 2 to request the first type of information from an MD 4 which is able to provide the first type of information to the network 1. Thereby the RP 6 may act as proxy for the service 3 in finding the information it desires.

FIG. 8*b* is a schematic flow chart of another embodiment of a method performed by an RP 6, of the present disclosure. The steps of receiving 81 a service message C and of sending 82 an request message E are as discussed with reference to FIG. 8*a*. In addition, optional step 83 (illustrated with dashed boxes in the figure) may be performed. Thus, in some embodiments, the RP 6 may to the network element 2 send 83 an address to the service 3, indicating to the network element 2 to request the MD 4 to send the first type of information to the service 3 by means of the address. Thereby enabling direct communication between the MD 4 and the service 3.

FIG. 9*a* is a schematic flow chart of an embodiment of a method performed by a machine device 4 able to provide a first type of information to a communication network 1, of the present disclosure. The MD 4 receives 91 a request message F from a network element 2 in the communication network 1, the request message comprises a token of a service 3, an address to the service 3 and a request for the MD 4 to send the first type of information together with the token to the service 3. Then, the MD 4 sends 92 to the service 3 an information message H comprising the first type of information and the token by means of the received 91 address to the service 3. The information message H may be sent directly to the service 3 or via the NW element 2 and/or GW 5.

FIG. 9*b* is a schematic flow chart of another embodiment of a method performed by a machine device 4 able to provide a first type of information to a communication network 1, of the present disclosure. The steps of receiving 91 a request message F and of sending 92 an information message H are as discussed with reference to FIG. 9*a*. In addition, optional step 93 (illustrated with dashed boxes in the figure) may be performed. Thus, in some embodiments, an information type message B is sent 93 to the network element 2, the message B comprising an indication that the MD 4 is able to provide the first type of information, before receiving 91 the request message F from the NW element 2.

EXAMPLE

An example is hereby provided with reference to FIGS. 1 and 2.

Thus, as described by means of FIG. 2, the service 3 may register itself to the RP 6 by means of the service message C and expresses interest in which type of information it would like to receive and associates this interest with a token (a value that is opaque to other nodes/elements of the network, but which the service can use to match incoming data to a certain kind of information or set of MDs). A service may proclaim interest in several types of information, each associated with a different token. When the network element 2 sends information about available resources such as information types and MDs 4, e.g. sensors, to the RP 6, by means of the information type message D, the RP may reply by means of the request message E comprising the address of the service 3 that is interested in the type of information and the token. It should be noted that it is possible that no services 3 are registered with the RP 6 when a network element 2 informs the RP of available resources or a new service 3 register later on and expresses interest in the resource(s). Therefore, the RP 6 may send unsolicited information messages E to the network element 2 having resources in which (new) services 3 are interested. For this purpose, the RP 6 keeps track of resources and gateways 5 the NW element 2 and MDs 4 are attached to. When the NW element detects an MD 4 that is providing the information type that is of interest to a service 3, the NW element sends a request F to the MD. The request F may contain two extension options: the token and/or the address of the service 3 requesting the information type. The MD 4 may register the request F and acknowledges the registration to the NW element 2 by means of the response G. However, instead of using the address of the NW element 2 as the destination for the information message H comprising information data of the requested information type, the MD may use the address of the service 3 provided in the request F. The MD 4 also includes the token in all information messages H-J. When the service 3 receives new information message H, it uses the token therein to match the value of the token to the type of MD 4 or information that it had indicated interest of.

Below follow some other aspects of the present disclosure.

According to an aspect of the present disclosure, there is provided a network element 2 for a communication network 1. The network element comprises means (e.g. the processor circuitry 31 such as the MD detector 34, possibly in cooperation with the communication interface 33) for detecting 71 an MD 4 able to provide a first type of information to the network 1. The network element 2 also comprises means (e.g. the processor circuitry 31 in cooperation with the communication interface 33) for receiving 72 a request message E comprising a token of a service 3 which is interested in receiving the first type of information. The network element 2 also comprises means (e.g. the processor circuitry 31 in cooperation with the communication interface 33) for sending 73 a request message F to the MD 4 comprising the token and a request for the MD to send the first type of information together with the token.

According to another aspect of the present disclosure, there is provided a rendezvous point (RP) 6 for a communication network 1. The RP comprises means (e.g. the processor circuitry 41 in cooperation with the communication interface 43) for receiving 81 a service message C from a service 3 comprising an indication that the service 3 is interested in receiving a first type of information, and comprising a token of the service 3 for the first type of information. The RP also comprises means (e.g. the processor circuitry 41 in cooperation with the communication interface 43) for sending 82 a request message E comprising a token of the service 3 to a network element 2 in the communication network 1, indicating to the network element to request the first type of information from a machine device (MD) 4 which is able to provide the first type of information to the network 1.

According to another aspect of the present disclosure, there is provided a machine device (MD) 4 configured to be able to provide a first type of information to a communication network 1. The MD comprises means (e.g. the processor circuitry 51 in cooperation with the communication interface 53) for receiving 91 a request message F from a network element 2 in the communication network 1, the request message comprising a token of a service 3, an address to the service 3 and a request for the MD 4 to send the first type of information together with the token to the service 3. The MD also comprises means (e.g. the processor circuitry 51 in cooperation with the communication interface 53) for sending 92 an information message H comprising the first type of information and the token to the service 3 by means of the received 91 address to the service 3.

According to another aspect of the present disclosure, there is provided a computer program product 70 comprising an embodiment of a computer program 71 of the present disclosure and a computer readable means 72 on which the computer program is stored.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed by a network element in a communication network, the method comprising:
   detecting a machine device, MD, able to provide a first type of information to the network;
   receiving a request message (E) comprising a token of a service which is interested in receiving the first type of information, where the token identifies to the service the first type of information, where the request message (E) is received from a rendezvous point, RP, in the network, which RP is aware of that the service is interested in receiving the first type of information, and where at least one of a location of the MD and a location of the service is not known by the other of the MD and the service; and
   sending a request message (F) to the MD comprising the token and a request for the MD to send the first type of information together with the token.

2. The method of claim 1, further comprising:
   receiving an address to the service;
   wherein the request message (F) comprises the received address to the service and an indication for the MD to send the first type of information to the service by means of the address.

3. The method of claim 1, further comprising:
   receiving an indication that the service is interested in receiving the first type of information, before sending the request message (F) to the MD.

4. The method of claim 1, further comprising:
   receiving an information type message (B) from the MD comprising an indication that the MD is able to provide the first type of information, before sending the request message (F).

5. The method of claim 1, wherein the network element is comprised in, or otherwise associated with, a gateway in the network, e.g. a capillary network gateway.

6. A network element for a communication network, the network element comprising:
   processor circuitry; and
   a storage unit storing instructions that, when executed by the processor circuitry, cause the network element to:
      detect a machine device, MD, able to provide a first type of information to the network;
      receive a request message (E) comprising a token of a service which is interested in receiving the first type of information, where the token identifies to the service the first type of information, where the request message (E) is received from a rendezvous point, RP, in the network, which RP is aware of that the service is interested in receiving the first type of information, and where at least one of a location of the MD and a location of the service is not known by the other of the MD and the service; and
      send a request message (F) to the MD comprising the token and a request for the MD to send the first type of information together with the token.

7. A non-transitory computer program comprising computer program code which is able to, when run on processor circuitry of a network element in a communication network, cause the network element to:
   detect a machine device, MD, able to provide a first type of information to the network;
   receive a request message (E) comprising a token of a service which is interested in receiving the first type of information, where the token identifies to the service the first type of information, where the request message (E) is received from a rendezvous point, RP, in the network, which RP is aware of that the service is interested in receiving the first type of information, and where at least one of a location of the MD and a location of the service is not known by the other of the MD and the service; and
   send a request message (F) to the MD comprising the token and a request for the MD to send the first type of information together with the token.

8. A method performed by a rendezvous point, RP, in a communication network, the method comprising:
   receiving a service message (C) from a service comprising an indication that the service is interested in receiving a first type of information, and comprising a token of the service for the first type of information, where the token identifies to the service the first type of information; and
   sending a request message (E) comprising the token to at least one network element in the communication network, indicating to the network element to request the first type of information from a machine device, MD, which is able to provide the first type of information to the service, where at least one of a location of the MD and a location of the service is not known by the other of the MD and the service.

9. The method of claim 8, further comprising:
   sending, to the network element, an address of the service, indicating to the network element to request the MD to send the first type of information to the service by means of the address.

10. The method of claim 8, wherein the service message (C) comprises a constraint for the first type of information, e.g. a timer period during which the service is interested in receiving the first type of information, that the information should come from a certain type of MD, that the MD providing the information should be from a certain geographical area, or that only a certain amount of MDs should be used even if more are available.

11. A rendezvous point, RP, for a communication network, the RP comprising:
   processor circuitry; and
   a storage unit storing instructions that, when executed by the processor circuitry, cause the RP to:
      receive a service message (C) from a service comprising an indication that the service is interested in receiving a first type of information, and comprising a token of the service for the first type of information, where the token identifies to the service the first type of information; and
      send a request message (E) comprising the token to at least one network element in the communication network, indicating to the network element to request the first type of information from a machine device, MD, which is able to provide the first type of information to the service, where at least one of a location of the MD and a location of the service is not known by the other of the MD and the service.

12. A non-transitory computer program comprising computer program code which is able to, when run on processor circuitry of a rendezvous point, RP, in a communication network, cause the RP to:
- receive a service message (C) from a service comprising an indication that the service is interested in receiving a first type of information, and comprising a token of the service for the first type of information, where the token identifies to the service the first type of information; and
- send a request message (E) comprising the token to at least one network element in the communication network, indicating to the network element to request the first type of information from a machine device, MD, which is able to provide the first type of information to the service, where at least one of a location of the MD and a location of the service is not known by the other of the MD and the service.

13. A method performed by a machine device, MD, able to provide a first type of information to a communication network, the method comprising:
- receiving a request message (F) from a network element in the communication network, the request message comprising a token of a service, an address to the service and a request for the MD to send the first type of information together with the token to the service, where the token identifies to the service the first type of information and at least one of a location of the MD and a location of the service is not known by the other of the MD and the service; and
- sending an information message (H) comprising the first type of information and the token to the service by means of the received address to the service.

14. The method of claim 13, further comprising:
- sending an information type message (B) to the network element comprising an indication that the MD is able to provide the first type of information, before receiving the request message.

15. A machine device, MD, configured to be able to provide a first type of information to a communication network, the MD comprising:
- processor circuitry; and
- a storage unit storing instructions that, when executed by the processor circuitry, cause the MD to:
  - receive a request message (F) from a network element in the communication network, the request message comprising a token of a service, an address to the service and a request for the MD to send the first type of information together with the token to the service, where the token identifies to the service the first type of information and at least one of a location of the MD and a location of the service is not known by the other of the MD and the service; and
  - send an information message (H) comprising the first type of information and the token to the service by means of the received address to the service.

16. A non-transitory computer program comprising computer program code which is able to, when run on processor circuitry of a machine device, MD, able to provide a first type of information to a communication network, cause the MD to:
- receive a request message (F) from a network element in the communication network, the request message comprising a token of a service, an address to the service and a request for the MD to send the first type of information together with the token to the service, where the token identifies to the service the first type of information and at least one of a location of the MD and a location of the service is not known by the other of the MD and the service; and
- send an information message (H) comprising the first type of information and the token to the service by means of the received address to the service.

\* \* \* \* \*